(12) United States Patent
Newell

(10) Patent No.: US 8,914,820 B2
(45) Date of Patent: *Dec. 16, 2014

(54) SYSTEMS AND METHODS FOR MEMORIALIZING A VIEWERS VIEWING EXPERIENCE WITH CAPTURED VIEWER IMAGES

(75) Inventor: Nicholas Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/619,633

(22) Filed: Sep. 14, 2012

(65) Prior Publication Data

US 2013/0014142 A1 Jan. 10, 2013

Related U.S. Application Data

(63) Continuation of application No. 13/432,517, filed on Mar. 28, 2012, now Pat. No. 8,286,202, which is a continuation of application No. 12/408,324, filed on Mar. 20, 2009, now Pat. No. 8,161,504.

(51) Int. Cl.
| | |
|---|---|
| H04N 7/16 | (2011.01) |
| H04H 60/33 | (2008.01) |
| H04N 5/77 | (2006.01) |
| H04N 21/4415 | (2011.01) |
| H04N 21/443 | (2011.01) |
| H04N 21/442 | (2011.01) |
| H04N 21/4223 | (2011.01) |
| H04H 60/45 | (2008.01) |
| H04N 21/433 | (2011.01) |
| H04N 21/422 | (2011.01) |

(52) U.S. Cl.
CPC ............... *H04N 5/77* (2013.01); *H04H 60/33* (2013.01); *H04N 21/4415* (2013.01); *H04N 21/4438* (2013.01); *H04N 21/44213* (2013.01); *H04N 21/4223* (2013.01); *H04H 60/45* (2013.01); *H04N 21/4334* (2013.01); *H04N 21/42203* (2013.01)
USPC .................... 725/12; 725/20; 725/136

(58) Field of Classification Search
None
See application file for complete search history.

(56) References Cited

U.S. PATENT DOCUMENTS

| | | | |
|---|---|---|---|
| 7,269,835 B2 | 9/2007 | Swix et al. | |
| 7,814,511 B2 | 10/2010 | Macrae et al. | |
| 8,161,504 B2 * | 4/2012 | Newell ........................... | 725/12 |
| 8,286,202 B2 * | 10/2012 | Newell ........................... | 725/12 |
| 2002/0062481 A1 | 5/2002 | Slaney et al. | |
| 2002/0178440 A1 * | 11/2002 | Agnihotri et al. ............... | 725/10 |
| 2003/0066071 A1 | 4/2003 | Gutta et al. | |
| 2003/0081834 A1 * | 5/2003 | Philomin et al. .............. | 382/190 |
| 2003/0093784 A1 * | 5/2003 | Dimitrova et al. .............. | 725/10 |
| 2004/0210942 A1 | 10/2004 | Lemmons | |

(Continued)

FOREIGN PATENT DOCUMENTS

| | | |
|---|---|---|
| WO | 01/63916 A1 | 8/2001 |
| WO | 2004/036897 A2 | 4/2004 |

*Primary Examiner* — Justin P Misleh
(74) *Attorney, Agent, or Firm* — Lowe Graham Jones PLLC

(57) ABSTRACT

Systems and methods of memorializing a viewer's viewing experience are disclosed. An exemplary embodiment presents a movie to the viewer, detects an occurrence of one of a plurality of event capture triggers, captures at least one image of the viewer in response to detecting the event capture trigger, and stores the image of the viewer.

21 Claims, 3 Drawing Sheets

(56) References Cited

U.S. PATENT DOCUMENTS

| | | |
|---|---|---|
| 2006/0195887 A1 | 8/2006 | Shusman |
| 2007/0150916 A1 | 6/2007 | Begole et al. |
| 2009/0037945 A1 | 2/2009 | Greig et al. |
| 2009/0094630 A1 | 4/2009 | Brown |
| 2009/0131764 A1* | 5/2009 | Lee et al. .................. 600/301 |
| 2009/0177528 A1 | 7/2009 | Wu et al. |
| 2009/0276802 A1 | 11/2009 | Amento et al. |
| 2010/0086283 A1 | 4/2010 | Ramachandran et al. |
| 2010/0199310 A1 | 8/2010 | Newell |
| 2010/0226526 A1 | 9/2010 | Mondro et al. |
| 2010/0242063 A1 | 9/2010 | Slaney et al. |
| 2012/0233638 A1 | 9/2012 | Slaney et al. |

* cited by examiner

US 8,914,820 B2

SYSTEMS AND METHODS FOR MEMORIALIZING A VIEWERS VIEWING EXPERIENCE WITH CAPTURED VIEWER IMAGES

PRIORITY CLAIM

This patent application is a Continuation of U.S. Non-Provisional patent application Ser. No. 13/432,517, filed Mar. 28, 2012, published as U.S. Publication No. 2012/0185887, and entitled "Systems and Methods for Memorializing a Viewer's Viewing Experience with Captured Viewer Images," which is a Continuation of U.S. Non-Provisional patent application Ser. No. 12/408,324, filed Mar. 20, 2009, published as U.S. Publication No. 2010/0238303, issued Apr. 17, 2012 as U.S. Pat. No. 8,161,504, and entitled "Systems and Methods for Memorializing a Viewer's Viewing Experience with Captured Viewer Images," the content of which are herein incorporated by reference in their entireties.

BACKGROUND

Viewers of programming typically have unique, personal experiences when viewing programming presented on a media presentation device, such as a television (TV), personal computer, or the like. In some situations the viewer would, for a variety of reasons, like to remember their reactions to their viewing of the programming. The viewer may take notes, but if the notes are made during the program presentation, the note taking could be very distracting. If the viewer makes their notes after the end of the program presentation, their recall of their reaction is likely to be diminished or incorrect. Further, they must recall particular reactions to particular portions or scenes of the program presentation.

Accordingly, it is desirable to provide a way for a viewer to easily recall their reactions during presentation of programming. Further, it is desirable to accurately associate what portions or scenes of the presented programming elicited which particular reaction from the viewer.

SUMMARY

Systems and methods of memorializing a viewer's viewing experience are disclosed. An exemplary embodiment presents a movie to the viewer, detects an occurrence of one of a plurality of event capture triggers, captures at least one image of the viewer in response to detecting the event capture trigger, and stores the image of the viewer. The captured images of the viewer's experience may be presented at a later time.

BRIEF DESCRIPTION OF THE DRAWINGS

Preferred and alternative embodiments are described in detail below with reference to the following drawings.

DETAILED DESCRIPTION

Figure 1:
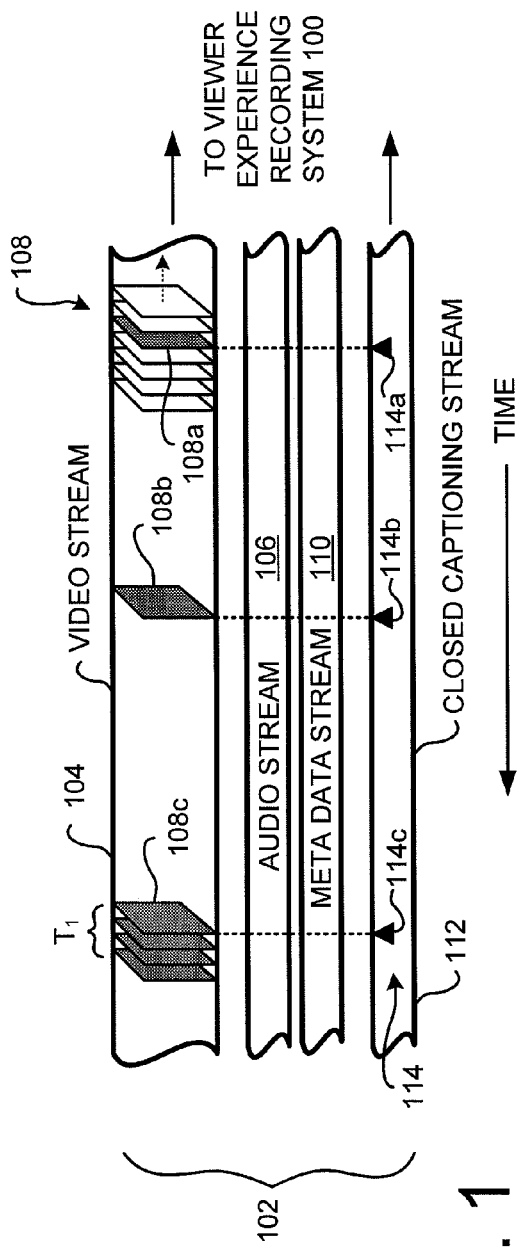
FIG. 1 conceptually illustrates a program stream received by an embodiment of the viewer experience recording system.

FIG. 1 conceptually illustrates a program stream 102 received by an embodiment of the viewer experience recording system 100. The program stream 102 includes a video stream 104, a corresponding audio stream 106, and a corresponding meta data stream 110. The video stream 104 is comprised of a plurality of serially sequenced video frames 108, each having a particular image of a program. The video frames 108 are serially presented so as to create a moving picture. The audio stream 106 may include spoken words, music, and background sounds. The audio stream 106 is sequenced with the video frames 108 such that spoken words, music, and background sounds of the audio stream 106 correspond in time with the moving picture. Some program streams 102 may include a meta data stream 110 which contains other information of interest.

A closed captioning stream 112 is also conceptually illustrated as part of the program stream 102. The closed captioning stream 112 is typically a textual presentation of the words of the audio stream 106. The textual presentation is provided for hearing impaired viewers or for viewers in an area with relatively loud ambient noise levels, such as a bar or the like. The words of the closed captioning stream 112 are sequenced so as to generally correspond to the spoken words of the audio stream 106.

In an exemplary embodiment of the viewer experience recording system 100, a plurality of event capture triggers 114 are embedded in the closed captioning stream 112 at a predefined, unique scene of interest of the program stream 112. In response to detecting an embedded event capture trigger 114 in the presented program stream 102, one or more still images, a video segment, and/or an audio clip are captured to record the viewer's reaction to the scene corresponding to the event capture trigger 114. The image information, and/or audio information, is then generated and saved. Accordingly, the stored images (and the optional audio recordings) are available for later viewing to memorialize the viewer's viewing experience.

A first capture trigger 114a is illustrated as being associated with a first video frame 108a of interest. A second capture trigger 114b is illustrated as being associated with a second video frame 108b of interest. Thus, from time to time during presentation of the program stream 102, the reaction of the viewer is recorded.

A third capture trigger 114c is illustrated as being associated with a scene of interest represented by a plurality of video frames 108c. The length of the scene of interest is represented by a time, $T_1$. Thus, if a series of images of the viewer 202 are captured, the number of captured images can be coordinated with the length $T_1$ of the scene of interest corresponding to the plurality of video frames 108c. Here, a predefined time between each of the serially captured images corresponds to the length $T_1$ of the scene of interest and the number of captured images. Similarly, if a video is captured, the length of the captured video can be coordinated with the length $T_1$ of the scene of interest.

There may be many event capture triggers 114 embedded at predefined locations in the closed captioning stream 112. From time to time, an embedded event capture trigger 114 is detected in the closed captioning stream 112. In response to detecting the embedded event capture trigger 114, one or more images, or a video segment, of a viewer are captured to memorialize the viewer's viewing experience. Some embodiments may record an audio clip in response to detecting the event capture trigger 114.

In alternative embodiments, the event capture triggers 114 may be embedded in the video stream 104, the audio stream 106, and/or the meta data stream 110 of the program stream 102. In some embodiments, the corresponding event capture triggers 114 are embedded in two or more of the video stream 104, the audio stream 106, the meta data stream 110, and/or closed captioning stream 112 so that different embodiments of the viewer experience recording system 100 are operable to capture images of the viewer upon detection of one of the embedded event capture triggers 114.

The predefined location of an embedded event capture trigger 114 corresponds to a particular scene, event, or other point of interest in the selected program of interest expected to elicit a response from the viewer. For example, a particularly scary scene in a horror movie could be expected to frighten the viewer. The event capture trigger 114 would be associated with a video frame 108 in the program stream 102 so as to initiate capture of the images of the viewer (and the optional audio recording) at a predefined time when the viewer is anticipated to show their reaction to the particularly scary scene. Accordingly, the event capture trigger 114 is embedded in one or more of the video stream 104, the audio stream 106, the meta data stream 110, and/or closed captioning stream 112 at a location which corresponds to the presentation time of the video frame 108.

As another example, a sports program may show a score made by a famous player. The event capture trigger 114 is located in the programming stream 102 so as to initiate capture of the images of the viewer (and/or an optional audio recording) at a time when the viewer is anticipated to show their reaction to the score.

It is appreciated that for many of the programs presented to a viewer, the event capture triggers 114 are embedded into the program stream 102 at predefined locations. Examples of such programs include movies, television programs, or the like. However, may programs are presented in real time, or near real time, to the viewer. For example, a sporting event, a news event, a game show, or a political speech may be captured and presented with little or no time delay. Accordingly, event capture triggers 114 are embedded into the program stream 102 at selected locations on a dynamic basis. For example, a person may actuate a device that generates and embeds an event capture trigger 114 into the program stream 102. For example, the person may actuate the device in response to a particular event, such as a score in a sporting event. Alternatively, or additionally, a device may automatically generate and embed an event capture trigger 114 into the program stream 102. For example, a scoring detection device may generate and embed an event capture trigger 114 in response to detecting the score in the sporting event.

In some embodiments, the event capture trigger 114 is embedded, or encoded, into the program stream 102 such that the viewer does not perceive the occurrence of the event capture trigger 114. Thus, captured images of the viewer are covertly captured to record the spontaneous reaction of the viewer to the presented programming.

Alternatively, or additionally, an audio and/or visual event capture trigger queue may be presented to the viewer so that the viewer is aware that their image is being captured. For example, an icon or other suitable indicator may be presented on a display in response to detecting an event capture trigger 114. As another example, an audible sound or tone may be emitted in response to detecting an event capture trigger 114.

Figure 2:
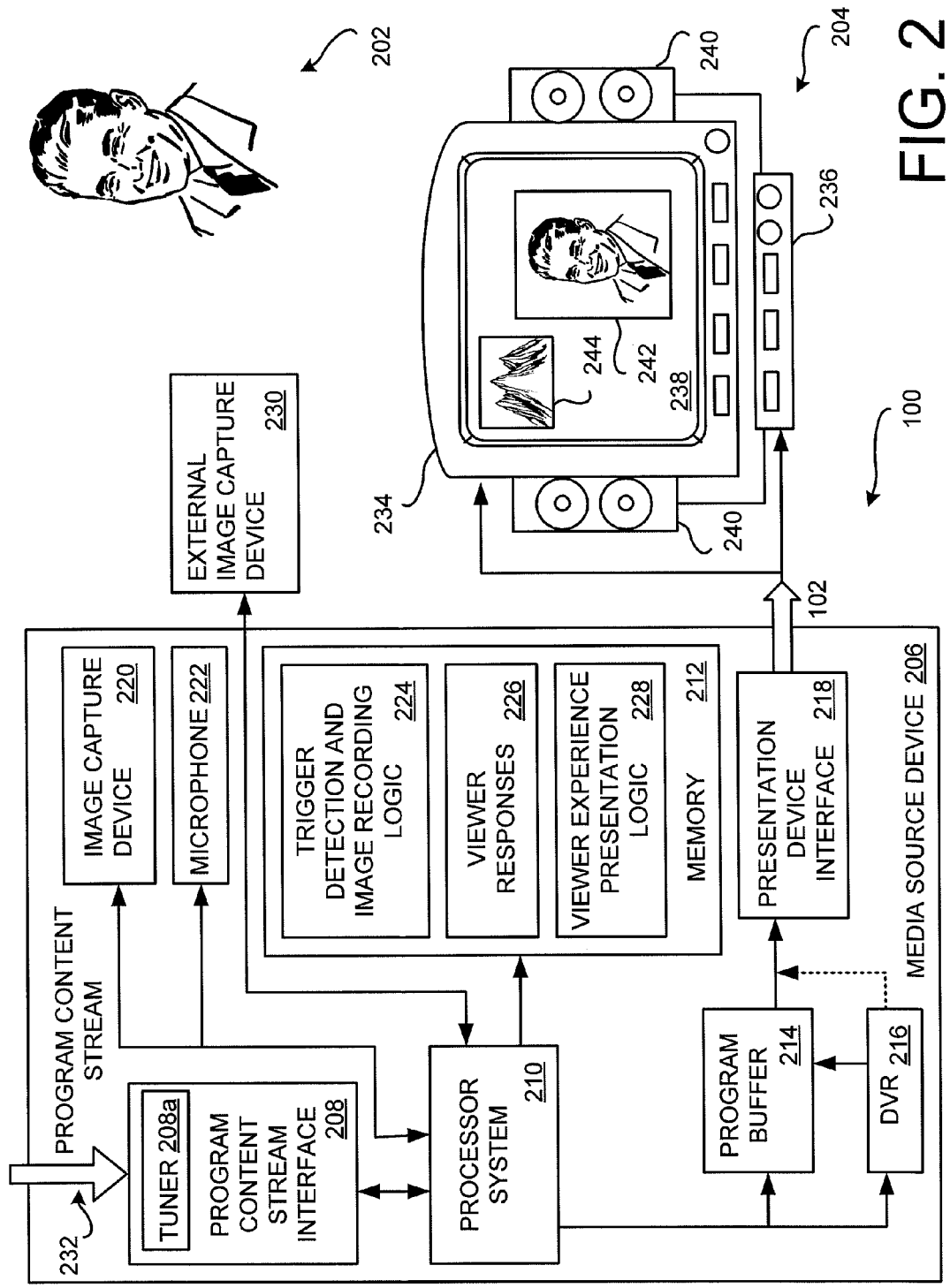
FIG. 2 is a block diagram of a viewer experience recording system that captures the experience of a viewer of a program presented by a media presentation device.

FIG. 2 is a block diagram of a viewer experience recording system 100 that is operable to capture the experience of a viewer 202 of a program presented by a media presentation device 204. The media presentation device 204 is receiving the program stream 102 from a media source device 206. In this exemplary embodiment, the media source device 206 is a set top box (STB). Embodiments of the viewer experience recording system 100 may be implemented in other media source devices, such as, but not limited to, stereos, radios, televisions (TVs), digital video disc (DVD) players, digital video recorders (DVRs), personal device assistants (PDAs), cell phones, or a personal computer (PC).

The non-limiting exemplary media source device 206 comprises a program content stream interface 208, a processor system 210, a memory 212, a program buffer 214, an optional digital video recorder (DVR) 216, a presentation device interface 218, an optional image capture device 220, and an optional microphone 222 (which may be implemented as a component of the media source device 206 or which may be an external device). The memory 212 comprises a portion for the trigger detection and image recording logic 224, a portion for storing viewer responses 226, and an optional portion for the viewer experience presentation logic 228. Other media source devices 206 may include some, all, or none of the above-described media processing components. Further, additional components not described herein may be included in alternative embodiments.

The image capture device 220 is pointed outwardly from the media source device 206 in a direction that is anticipated to result in the capture of images of the viewer 202. Alternatively, or additionally, an external image capture device 230, which may be portable or reside in another device, may be positioned so as to be pointed towards the viewer 202. The external image capture device 230 may be independently placed and oriented in any suitable location in a media room, home, theatre or the like. The external image capture device 230 communicates captured image information to the media source device 206 using any suitable communication medium, including physical wires, light, or radio frequency (RF).

In response to detecting an embedded event capture trigger 114 in the presented program stream 102, the processor system 210 generates an image capture command that is communicated to the image capture devices 216 and/or 230. In response to receiving the image capture command, the image capture devices 216 and/or 230 capture one or more still images, or a video segment, of the viewer 202. Some embodiments may also record audio clips with the microphone 222. Image information, and/or audio information, corresponding to the captured images (and the audio clips, if recorded) is then generated and saved into the captured viewer responses 226 region of the memory 212. Accordingly, the stored images (and the optional audio recordings) are available for later viewing by the viewer 202 or another interested party.

The functionality of the exemplary media source device 206, here a set top box (STB), is now broadly described. One or more program content streams 232 are received by the program content stream interface 208. One or more tuners 208a in the program content stream interface 208 selectively tune to the program stream 102 in accordance with instructions received from the processor system 210. A program content stream 232 typically comprises a plurality of program streams multiplexed together.

The processor system 210, based upon a request for a program of interest specified by a viewer 202, parses out program content associated with the program of interest. The program content is then assembled into the program stream 102 having the video stream 104, the audio stream 106, the meta data stream 110, and/or closed captioning stream 112. The program stream 102 may be saved into the program buffer 214 such that the program content can be streamed out to a media presentation device, such as the television 230, via the presentation device interface 218. Alternatively, or additionally, the program content may be saved into the DVR 216 for later presentation.

In this simplified embodiment, the presentation device interface 218 is illustrated as coupled to two exemplary media presentation devices, the television (TV) 234 and a surround-sound receiver 236. The video stream 104 is displayed on the TV display 238 and the audio stream 106 is reproduced as sounds by the speakers 240.

After the viewer 202 has ended their viewing of the program of interest with the embedded event capture triggers 114 therein, a plurality of stored images (and optional audio recordings) are stored in the viewer responses 226 portion of the memory 212. To review the stored images (and the optional audio recordings), the viewer experience presentation logic 228 is executed by the processor system 210 such that the stored images (and the optional audio recordings) are retrieved and presented to the viewer 202. For example, the stored images (and the optional audio recordings) are presented on the TV display 238.

The viewer 202 may use the viewer experience presentation logic 228 to edit or modify the plurality of stored images (and optional audio recordings) that are stored in the viewer responses 226 portion of the memory 212. Any suitable image editor process and/or system may be incorporated into or integrated with embodiments of the viewer experience presentation logic 228.

In an exemplary embodiment, the stored images (and the optional audio recordings) are presented as a show of a plurality of slides 242 on the TV display 238 coupled to the media presentation device 204. Any suitable slide show presentation logic or program may be used. The, images are serially retrieved and presented to the viewer 202.

If audio recordings are available, they may be reproduced as sounds on the speakers 240. In embodiments where the audio clips are captured concurrently with images of the viewer 202, the audio recordings and the images may be presented at the same time on the media presentation device 204.

Additionally, or alternatively, the video frame 108 associated with the captured image of the viewer 202 (presented as the slide 242), may be presented as a supplemental image 244. Here, the supplemental image 244 is a mountain scene which brought pleasure to the viewer 202. Accordingly, the supplemental image 244 reminds the viewer 202 which scene caused the viewer's experience. The supplemental image 244 may be presented with the slide 242 using any suitable presentation scheme, such as a picture-in-a-picture (PIP) format, a split screen format, a tiled image format, or the like. Further, a supplemental video portion and/or a supplemental audio clip may be presented to the viewer 202.

Figure 3:
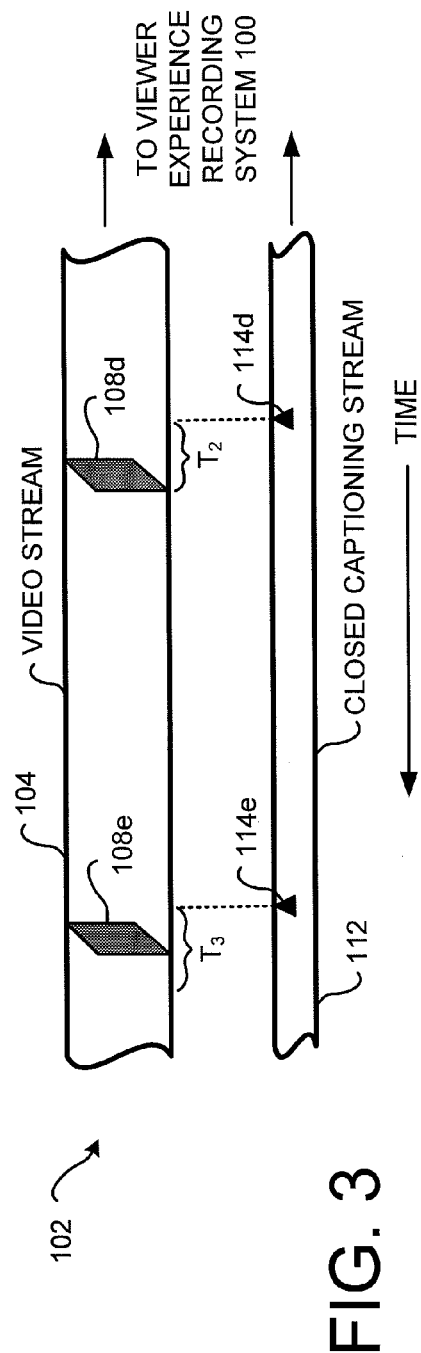
FIG. 3 conceptually illustrates a closed captioning stream showing alternative locations of event capture triggers with respect to the frame of interest.

FIG. 3 conceptually illustrates a closed captioning stream showing alternative locations of the event capture triggers 114d, 114e with respect to their video frames of interest 108d, 108e. In the first example, the event capture trigger 114d is located in the closed captioning stream 112 in advance of the presentation time of the video frame 108d so that the capturing of the experience of the viewer 202 is initiated in advance of the presentation of the video frame 108d. That is, the event capture trigger 114 is associated with a frame of interest that precedes the scene of interest. If a series of images of the viewer 202 are captured, the number of captured images can be coordinated with the time $T_2$ so that a changing reaction of the viewer 202 to the video frame 108d is captured. Similarly, if a video is captured, the length of the captured video can be coordinated with the time $T_2$ of the scene of interest.

In the second example, the event capture trigger 114e is located in the closed captioning stream 112 slightly before the presentation time of the video frame 108e so that the capturing of the experience of the viewer 202 is initiated just before, and continues after, the presentation of the video frame 108e. That is, the time $T_3$ encompasses a period before and a period after presentation of the video frame 108e. If a series of images of the viewer 202 are captured, the number of captured images can be coordinated with the time $T_3$ so that a changing reaction of the viewer 202 to the video frame 108e is captured. Similarly, if a video is captured, the length of the captured video can be coordinated with the time $T_3$ of the scene of interest.

Figure 4:
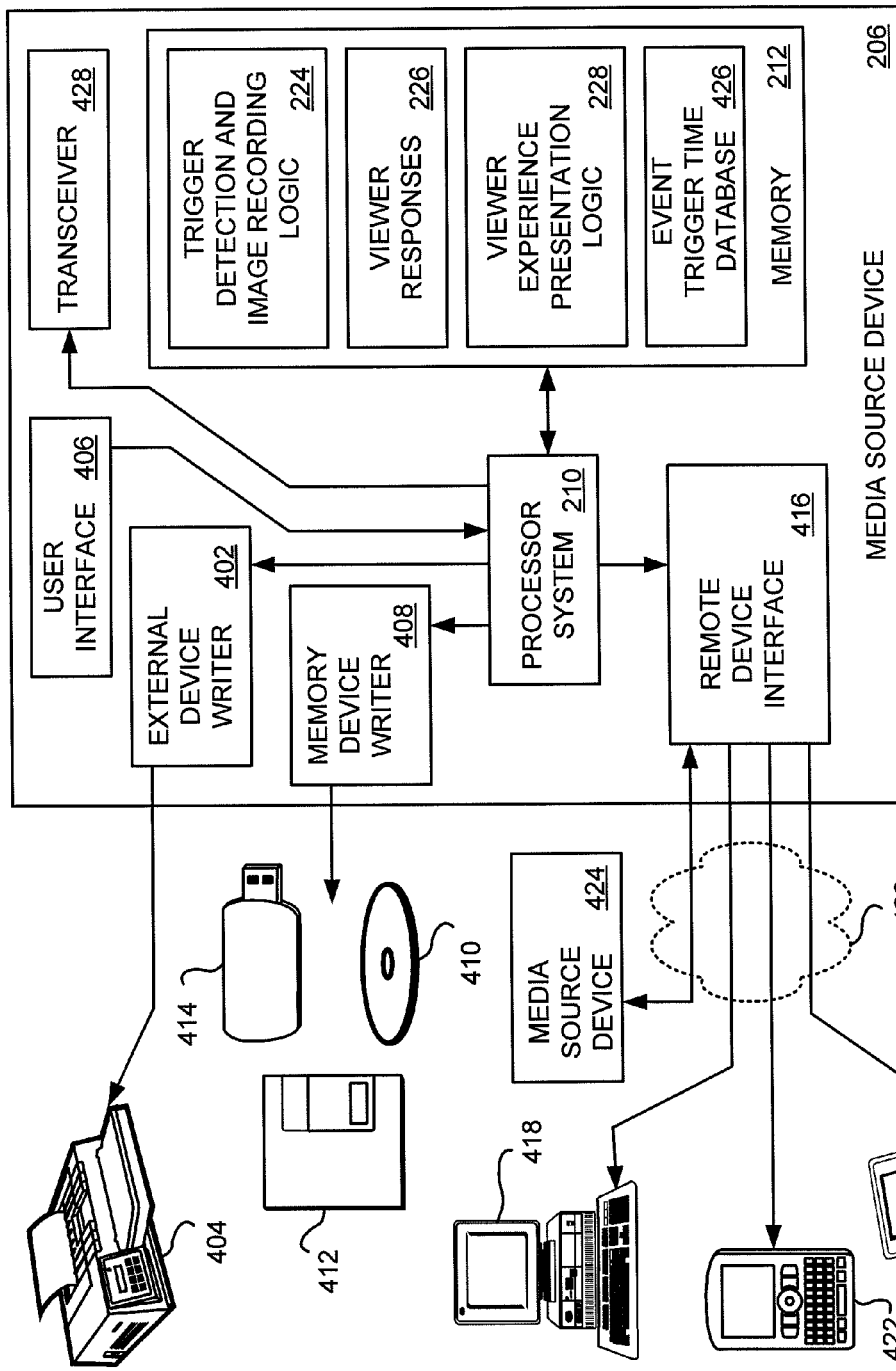
FIG. 4 is a block diagram of an alternative embodiment of the viewer experience recording system.

FIG. 4 is a block diagram of an alternative embodiment of the viewer experience recording system 100. All of, or selected ones of, the alternative embodiment features may be included in the alternative embodiment of the viewer experience recording system 100.

An alternative embodiment feature is an external device writer 402. The external device writer 402 is coupled to a printing device 404 which prints the captured images of the reaction of the viewer 202. Further, the associated supplemental images 244 may be printed.

In some embodiments, a user interface 406 allows the viewer 202, or another party, to add textual information that is associated with the captured images (and/or audio clips) of the reaction of the viewer 202. The user interface may be an integrated component of the media source device, or may be an external component. Non-limiting examples of the user interface 406 include a key board, a key pad, a touch-sensitive screen, and/or a menu driven system operated by a remote control unit.

Another alternative embodiment feature is a memory device writer 408. The memory device writer 408 is coupleable to an external memory device which stores the captured images (and/or audio clips) of the reaction of the viewer 202. Further, the associated supplemental images 244 and/or audio clips may be stored in the memory device. Non-limiting examples of a memory device include a compact disk (CD), a floppy disk 412, and a flash memory stick 414. Thus, the memory device writer 408 is a device that receives the particular memory device, and that writes to the particular memory medium used by that memory device. It is appreciated that since media devices are typically not compatible, a plurality of different memory device writers 408 may be included in alternative embodiments of the viewer experience recording system 100.

Another alternative embodiment feature is a remote device interface 416. The remote device interface 416 is coupleable to a remote device which receives and stores the captured images (and/or audio clips) of the reaction of the viewer 202. Further, the associated supplemental images 244 and/or audio clips may be stored in the remote device. Non-limiting examples of a remote device include a personal computer (PC) 418, a lap top computer 420, and a personal device assistant (PDA) 422. Non-limiting examples of a PDA 422 include cell phones and other wireless user devices. Thus, the remote device interface 416 is a device that communicates with a remote device using a suitable communication media. It is appreciated that since there are many different types of remote devices that employ many different types of communication media, a plurality of different remote device interfaces 416 may be included in an alternative embodiment of the viewer experience recording system 100.

Another example is a remote media source device 424 that is communicatively coupled to the media source device 206, via the remote device interface 416. The remote media source device 424 may include its own remote device interface (not shown). Thus, the remote media source device 424 receives and stores the captured images (and/or audio clips) of the reaction of the viewer 202. Then, at a later time, images of a second viewer (not shown) viewing the program of interest may be captured to memorialize their viewing experience. The captured images of the second viewer may be sent back to the media source device 206, or another remote device, such that the viewer 202 may see the second viewer's experience.

Alternatively, or additionally, the images of the second viewer may be combined with the images of the viewer 202. The combined images may be sent back to the media source device 206, or another remote device, such that the viewer 202 may see the second viewer's experience and their viewing experience. Or, the combined images may be sent may be sent to another remote device where a third person may see the viewing experiences of the viewer 202 and the second viewer.

Additionally, or alternatively, a viewer's recommendation may be incorporated into, communicated with, or associated with, the transmitted captured images so that the remote device receiving also receives the recommendation. Thus, the second viewer will appreciate that the program of interest is recommended for viewing. An exemplary media content recommendation system is disclosed the commonly assigned patent application entitled "Methods and Device for Recommending Media Content," having Ser. No. 12/362,720 by N. Newell and filed on Jan. 30, 2009, which is incorporated herein by reference in its entirety.

In some embodiments, the remote device is coupled to the remote device interface 416 using a wire connection. For example, but not limited to, the remote device interface 416 may be a suitable connection port, such as a s-video cable connection port or a uniform serial bus (USB) port.

In other embodiments, the remote device may communicate through an intermediary communication system 426. Non-limiting examples of the intermediary communication system 426 include a local area network (LAN), the Internet, or a public system telephony system (PSTN) which may be wire-based or wireless. Thus, the remote device interface 416 is configured to communicatively couple to and communicate over the intermediary communication system 426.

As an example of communicating the viewer's experience to a remote device, a parent and their young child may be viewing a children's movie at home. A plurality of event capture triggers 114 would, from time to time at particular scenes of interest, capture an image that includes at least the young child. After the viewing of the children's movie, the parent could prepare a slide show of the plurality of images (and optional audio recordings) stored in the viewer responses 226 portion of the memory 212. The parent may choose to edit the plurality of slides 242 using the viewer experience presentation logic 228. Then, the plurality of slides 242 (and optional audio recordings) may be communicated to a remote device so that grandmother and/or another interested relative could view the reactions of the young child watching the children's movie.

In an exemplary embodiment, at the remote device, a replaying of the presented program (with the embedded event capture triggers 114) may be performed in conjunction with presentation of the plurality of slides 242 (and optional audio recordings). For example, the grandmother may choose to view a presentation of the children's movie. As the children's movie is being presented, the event capture triggers 114 cause presentation of the corresponding captured images (and optional audio recordings) of their grandchild. Thus, the grandparent can share in the grandchild's viewing experiences at a later time and location.

In such an embodiment, a unique identifier is associated with each of the event capture triggers 114 and is associated with corresponding captured images of the viewer 202 at the time of image capture. During replay of the program, when an event capture trigger 114 is detected (along with its associated identifier), the image with the associated identifier is retrieved from the viewer response 226 and presented on a media presentation device.

Another alternative embodiment feature is a trigger time database 426. Here, times of the event capture triggers 114 are separately communicated to the media source device 206 and stored in memory 212. The times of each of the stored event capture triggers 114 are associated with a presentation time of the presented program. As presentation of the program stream 120 begins, a time of the presentation, such as the starting time, is synchronized with a time monitored or tracked by the media source device 206. When the predefined time of the event capture trigger 114 corresponds to a time in the presented program stream 120 designated for capturing the viewer's experience, a trigger event is initiated to capture images (and our audio clips) of the viewer 202.

Another alternative embodiment feature is a transceiver 428. Here, the event capture triggers 114 are separately communicated from the transceiver 428 to a remotely located image capture device 230 (and/or a remote microphone 222). The remotely located image capture device 230 (and/or a remote microphone 222) are configured to receive the transmitted event capture triggers 114 and capture the viewer's viewing experience. The remotely located image capture device 230 (and/or a remote microphone 222) may have their own memory media for storing the captured images, videos, and/or audio clips. Alternatively, or additionally, the remotely located image capture device 230 (and/or a remote microphone 222) may be configured to transmit the captured images, videos, and/or audio clips back to the transceiver 428 for storage in the memory 212. Any suitable transceiver (transmitter or receiver acting in combination or alone) may be used.

It is appreciated that embodiments of the viewer experience recording system 100 may be configured to capture images of multiple viewers 202. For example, a plurality of image capture devices 220, 230 may be used to capture images of an audience. Later viewing of the captured images (and audio clips if recorded) may be used to analyze the effect of particular scenes on the viewing audience. For example, effectiveness of an actor's performance may be assessed. Viewer reactions to alternative scenes, different music scores, sound effects, and/or endings may be assessed. Such information may be used in film editing to create a final version of the presented program. Further, if a director or the like is reviewing the program, audio clips may be used to capture the director's reaction to particular scenes. In such applications, a visible and/or audible event trigger queue may be used to prompt the director to provide commentary regarding the designated scene.

In some embodiments, the viewer responses 226 reside in available space in the DVR 216. Thus, the viewer experience presentation logic 228 would access images (and/or audio clips) residing in the DVR 216.

It should be emphasized that the above-described embodiments of the viewer experience recording system 100 are merely possible examples of implementations of the invention. Many variations and modifications may be made to the above-described embodiments. All such modifications and variations are intended to be included herein within the scope of this disclosure and protected by the following claims.

What is claimed is:

1. A method for capturing one or more images of a viewer, the method comprising:
receiving a program content stream with a movie, wherein the movie is defined by a plurality of different sequentially sequenced scenes of interest, and wherein the movie comprises:
a video stream arranged as a plurality of sequentially sequenced video frames, wherein each video frame is a particular image of the movie;
an audio stream; and
a plurality of event capture triggers, wherein each one of the plurality of event capture triggers are uniquely associated with a selected one of the plurality of sequentially sequenced video frames;
presenting the plurality of sequentially sequenced video frames to the viewer on a media presentation device;
detecting an occurrence of a first one of the plurality of event capture triggers, wherein detecting the first one of the plurality of event capture triggers occurs at a time that corresponds to a time of presentation of the associated selected video frame;
capturing at least one first image of the viewer in response to detecting the first one of the plurality of event capture triggers; and
storing the captured at least one first image of the viewer.

2. The method of claim 1, further comprising:
presenting the captured at least one first image of the viewer on the media presentation device, wherein the captured at least one first image presented in response to a conclusion of the presentation of the movie.

3. The method of claim 1, further comprising:
presenting the captured at least one first image of the viewer on the media presentation device, wherein the captured at least one first image is presented to the viewer after a conclusion of the presentation of the movie.

4. The method of claim 1, wherein the movie is communicated to a display via a media content stream, and wherein the plurality of event capture triggers are each embedded in the media content stream at locations corresponding to locations of the associated selected video frames in the media content stream.

5. The method of claim 1, wherein the plurality of event capture triggers and corresponding event capture trigger times reside in a memory of a media device that is communicating the movie to the media presentation device, and wherein each of the event capture trigger times associated with each of the event capture triggers are referenced with presentation times of the associated selected video frames, and further comprising:
synchronizing a time of each associated selected video frame with one of the event capture trigger times,
wherein detecting the occurrence of one of the event capture triggers occurs when each event capture trigger time corresponds to a presentation time of the associated selected video frame being presented on the media presentation device.

6. The method of claim 1, wherein capturing the at least one first image of the viewer comprises:
serially capturing a predefined number of images of the viewer in response to detecting the event capture trigger, wherein a predefined time separates each captured image.

7. The method of claim 1, wherein capturing the at least one first image of the viewer comprises:
capturing a video clip in response to detecting the event capture trigger.

8. The method of claim 1, wherein capturing the at least one first image of the viewer comprises:
capturing an audio clip in response to detecting the event capture trigger.

9. The method of claim 1, further comprising:
communicating the captured at least one first image to a remote device; and
presenting the movie and the captured at least one first image on a display coupled to the remote device,
wherein presentation of the at least one first image occurs at the time of presentation of the associated selected video frame of the movie.

10. The method of claim 1, further comprising:
communicating the captured at least one first image to a remote memory;
coupling the remote memory having the captured at least one first image to a remote device; and
presenting the movie and the captured at least one first image on a display coupled to the remote device,
wherein presentation of the at least one first image occurs at the time of presentation of the associated selected video frame of the movie.

11. The method of claim 1, further comprising:
storing the captured at least one first image in an external memory device that is detachably coupled to a memory writer of a media device that is communicating the movie to the media presentation device;
coupling the external memory having the captured at least one first image to a remote device; and
presenting the movie and the captured at least one first image on a display coupled to the remote device,
wherein presentation of the at least one first image occurs at the time of presentation of the associated selected video frame of the movie.

12. A media device configured to capture one or more images of a viewer, comprising:
an interface that receives a movie in at least one program stream,
wherein the movie comprises a video stream portion having a plurality of scenes that are arranged as a plurality of sequentially sequenced video frames that define a particular image of the movie, an audio stream portion with sounds corresponding to the plurality of scenes of the movie, and a plurality of event capture triggers, and
wherein each one of the plurality of event capture triggers are uniquely associated with a selected one of the plurality of sequentially sequenced video frames;
a processor system communicatively coupled to the interface,
wherein the processor system monitors a presentation of the plurality of sequentially sequenced video frames of the movie to the viewer and detects an occurrence of the event capture trigger corresponding to presentation of each one of a plurality of scenes of interest, and
wherein the processor system generates an image capture command based upon the event capture trigger such that the image capture command is generated at a time that corresponds to a time of presentation of the associated selected video frame to the viewer;
an image capture device communicatively coupled to the processor system, wherein the image capture device captures the at least one image of the viewer in response to receiving the generated image capture command; and a memory communicatively coupled to the image capture device that stores the at least one captured image of the viewer.

13. The media device of claim 12, further comprising:
a presentation device interface coupled to the processor system and at least one media presentation device,
wherein the movie is presented on the at least one media presentation device to the viewer while the at least one image of the viewer is captured, and wherein the at least one captured image of the viewer is retrieved from the memory and is displayed on the presentation device in response to a conclusion of presentation of the movie.

14. The media device of claim 12, further comprising:
a tuner residing that receives programming from a remote source,
wherein the tuner tunes to the program stream having the movie.

15. The media device of claim 12, wherein the image capture device resides within the media device.

16. The media device of claim 12, wherein the image capture device is an external image capture device communicatively coupled to the media device.

17. The media device of claim 12, wherein the image capture device is a video camera.

18. The media device of claim 12, further comprising:
a microphone communicatively coupled to the memory and the processor system,
wherein the microphone captures an audio clip in response to receiving the generated image capture command, and
wherein the captured audio clip is stored in the memory and is associated with the at least one captured image of the viewer.

19. The media device of claim 12, wherein the captured images are presented by the at least one media presentation device in response to a conclusion of the presentation of the movie.

20. The media device of claim 12, wherein the captured images presented by the at least one media presentation device in response to a conclusion of the presentation of the movie.

21. A media device configured to a movie and associated captured images of a first viewer, comprising:
an interface that receives the movie in at least one program stream,
wherein the movie comprises a video stream portion having a plurality of scenes that are arranged as a plurality of sequentially sequenced video frames that define a particular image of the movie, an audio stream portion with sounds corresponding to the plurality of scenes of the movie, and a plurality of event capture triggers,
wherein each one of the plurality of event capture triggers are uniquely associated with a selected one of the plurality of sequentially sequenced video frames of the movie,
wherein a plurality of captured images of the first viewer have been previously captured during a previous presentation of the movie to the first viewer, and
wherein each of the previously captured images of the first viewer were captured in response to presentation of the selected video frame associated with the respective one of the plurality of event capture triggers;
a memory communicatively coupled to the interface that stores the plurality of captured images of the first viewer that has been previously captured, wherein each one the captured images of the first viewer are respectively associated with at least one of the event capture triggers that was detected at the time of image capture and the associated selected image frame that was presented at the time of image capture; and
a processor system communicatively coupled to the interface and the memory,
wherein the processor system monitors a presentation of the plurality of sequentially sequenced video frames of the movie on a media presentation device to a second viewer,
wherein the processor system detects an occurrence of a first one of the plurality of event capture triggers, wherein the detecting occurs at a time corresponding to presentation of the associated selected image frame to the second viewer, and
wherein the previously captured image of the first viewer is retrieved and presented to the second viewer concurrently with the presentation of the associated selected video frame to the second viewer when the first one of the plurality of event capture triggers is detected.

* * * * *